United States Patent Office 3,356,520
Patented Dec. 5, 1967

3,356,520
DENSIFICATION OF CARBON BLACK
Alton E. Daniell, Houston, Tex., assignor to Ashland Oil
 & Refining Company, Houston, Tex., a corporation of
 Kentucky
No Drawing. Filed Mar. 13, 1964, Ser. No. 351,853
7 Claims. (Cl. 106—307)

ABSTRACT OF THE DISCLOSURE

Carbon black is densified without formation of pellets by tumultuously agitating the black while adding a densifying oil at a limited rate, resulting in a loose carbon black product free from difficultlty dispersible aggregates and having a substantially uniform oil distribution.

Background of the invention

This invention relates to densification, as distinguished from pelleting. It constitutes an improved method of increasing the apparent bulk density of loose carbon black powder to facilitate its storage, handling and shipment, without forming any substantial proportion of pellets and/or difficultly dispersable aggregates.

The well-known problems of extreme bulkiness and dustiness of carbon black powder, or "loose black" as it is sometimes called, have inspired many efforts towards altering its nature in various ways to better adapt it for storage, handling and shipment. At an early stage in the development of the art, it was taught that masses of loose black could be reduced in volume by mixing the black with a densifying liquid and then removing the liquid. Although it was then recognized that mineral and vegetable oils had utility in reducing the amount of airborne dust associated with loose black, no satisfactory method was then known to uniformly disperse oil on the black without the use of relatively volatile carrier liquids, the conventional practice at that time being to mix the coil with the carrier liquid to form a solution or emulsion, add the resultant mixture to the black, and then remove the carrier liquid mechanically and evaporatively. Unfortunately, black which had been densified by the above process contained lumps and aggregates which made it quite difficult to produce therefrom an ink which was sufficiently aggregate-free to be commerically acceptable. Also, the use of a volatile carrier liquid created a fire hazard and required special equipment for recovering the carrier liquid for reuse. Disappointed with this approach to the problem, the art turned to other procedures, particularly pelleting.

The trem "pelleting" refers to the process of forming pellets, cohesive globular masses of many closely packed carbon black particles. Pelleting is generally acknowledged to have diminished the dust and high bulk problems associated with loose black. However, certain practical applications of carbon black require that it be mixed with other materials in a thoroughly dispersed condition. When carbon black is purchased in pellet form for such uses as the making of ink, the pellets must be broken down into their constituent particles. This is quite difficult to achieve, at least in the measure required to produce ink that is free of undesirable undispersed aggregates. Special grinding or ball-milling of the pellets is frequently dictated. So-called "easy-dispersing" pellets have been offered to ink manufacturers. However, the easy-dispersing pellts ordinarily contain tars and pitches, especially those predominantly composed of bitumens, as dispersing agents. The incorporation of these materials introduces additional steps and complications into pelleting processes.

Many pellet-making processes and at least one fairly recent densification process involve wetting the carbon black with considerable quantities of water. In some such processes, the water is subsequently removed by drying, thus necessitating the consumption of fuel and power to operate a dryer. If the moisture is not removed from the black, it will be incompatible with oil-type paint and ink vehicles. Also, the presence of moisture creates other problems, complicating the charging of materials, causing discrepancies in tint, viscosiyt, flow, tone and color, and producing "liver," visually observable separation of moisture from the ink vehicle.

The above discussion may furnish a rational explanation for the fact that certain purchasers of carbon black, notatably ink makers, still purchase loose, unpelleted, undensified carbon black. They have chosen to endure the dust and high bulk of loose black rather than the problems associated with pellets. It is clear, then, that at least among one segment of carbon black purchasers there is an unfulfilled demand for carbon black manufacturers to devise an improved method of densifying loose carbon black.

It is the principal objects of this invention to fulfill the above demand. A further object is to produce loose black of significantly enhanced density without using water and without introducing large amounts of moisture into the black. Another object is to produce densified loose black without the aid of equipment for mechanically compressing the black. Still another object is to produce unpelleted oil-bearing black which compares favorably in density with some pelleted blacks. Yet another object is to obtain carbon black in a form that partakes of some of the advantages of pelleted carbon black, such as relatively high bulk density and freedom from giving off dust, without exhibiting the dispersing problems that are exhibited by carbon black pellets when they are incorporated in ink vehicles. Another object is to provide a method for preparing carbon black for shipment, storage or further treatment, employing equipment which is already available in many plants where carbon black pellets are now made. Other objects and advantages of this invention will be readily apparent from the description of the invention which follows.

Summary of the invention

The present invention involves a reversal of the present trend toward more and more highly complicated and refined pelleting procedures and does away with the various compromises with quality and economy resulting therefrom. Rather, the present invention involves a return to the former practice of densifying loose black with a densifying liquid. This invention involves an improved densification process in which the densifying liquid is oil and the oil is uniformly dispersed on each particle in a mass of carbon black particles to densify the mass. In this process the used of a carrier liquid that is more volatile than the densifying liquid is neither required nor desired. By bringing the black and the oil together directly under certain critical conditions, it is possible to densify the black to a very significant extent without producing pellets or difficulty dispersible aggregates. This is an unexpected result when one considers the fact that a pelleted product is produced by recent prior art processes involving direct admixture of oil and carbon black.

The objects of the invention are attained in a strikingly simple and straight-forward manner. Stable densifying oil is evenly distributed in the form of a fine mist onto particles of bulky, loose carbon black in a confined zone. At substantially all times during addition of the oil to the black, the black is maintained in a condition of tumultuous agitation and the rate of oil addition is limited to a rate which is no greater than that at which the oil can be readily taken up by said particles to prevent the collection of localized accumulations of oil among the particles.

Each 100 weight units of carbon black particles receive 5–32 parts of oil by weight. Addition of oil and agitation of the black are terminated prior to formation of any substantial proportion of pellets. Loose carbon black of significantly enhanced density and substantially free of difficultly dispersible agglomerates is taken from the confined zone. With or without additional treatment (other than pelleting) the densified black may then be used, stored or placed in a shipment container. The following discussion is intended to set forth the preferred mode of practicing the invention, along with a few of the many possible variations which may be employed without departing from the invention.

Description of preferred embodiments

Practicing the invention with any type of loose, bulky carbon black is contemplated. Furnace black, channel black and thermal black are exemplary of the various types of black which may be used. Among the various suitable types of furnace black which may be mentioned are: High Abrasion Furnace Black (HAF), a furnace black prepared from an oil feedstock and capable of imparting high abrasion resistance to vulcanized rubber when used as a filler therein; Intermediate-Super Abrasion Furnace Black (ISAF), a furnace black prepared from an oil feedstock and generally capable of imparting somewhat higher abrasion resistance to rubber than HAF black; and Fast Extruding Furnace Black (FEF), a black prepared from an oil feedstock and adapted to the production of relatively rapid-extruding extrusion mixtures of rubber and carbon black. The invention is generally useful for treating blacks intended for use in oil-extended rubber products. The term rubber, as used herein, includes natural rubber, blends of natural and synthetic rubber, and synthetic rubber or rubbers, such as those prepared by the emulsion polymerization of a butadiene-1,3 alone or in combination with at least one additional material which is polymerizable therewith. The invention will be found particularly useful in the treatment of ink-grade carbon blacks, blacks intended for use as pigments in printing inks. The black may enter the process of this invention in the same form in which it is first recovered during its production, or it may be subjected to any intervening treatment which may be desired to alter its properties and make it more suitable for a given purpose. For instance, the black may be subjected to surface oxidation to improve its usefulness in ink.

The oil to be used in the practice of this invention may be of mineral, vegetable or synthetic origin. The oil should be "stable." An oil is stable in the sense required by the present invention if it is relatively resistant to evaporation and is not subject to any substantial extent of oxidation polymerization under normal storage conditions for the final product. Preferably, the oil should exhibit a normal midboiling point of at least about 350° F. at atmospheric pressure. Examples of suitable oils include linseed oil, fatty oils, tall oils, various rubber extender oils and news ink vehicle oils.

In accordance with the invention, oil, in the form of a fine mist containing a multitude of tiny droplets, is projected onto an agitated bed of loose carbon black particles in a confined zone. The bed will have a certain average depth and a certain amount of exposed surface area as a consequence of the particular operating conditions under which the invention is practiced. As the oil mist is projected onto the exposed surface of the agitated bed, each incoming oil droplet will impinge upon one or more of the particles of black which happen to be at the surface of the bed at that moment, and will be rapidly transported and distributed to other portions of the bed. Conditions in the bed of black are controlled in such a manner that the particle or particles which initially receive a given droplet of oil are buffeted about and quickly transfer their temporary excess burden of oil to other particles in the bed as they collide with them. Thus, each particle of loose black in the bed gradually builds up a coating of oil and the oil is quickly and uniformly distributed throughout the mass of black.

The amount of oil which is employed to obtain the desired results may be quite widely varied. Amounts equal in weight to as little as about 5% of the carbon black have been employed with advantage. This amount may be increased considerably to as much as about 32% and higher. However, if much more than about 32% oil is used, the economic advantages of the process diminish and pellets begin to form in the product. If about 60% oil is used, a product resembling "mud" is obtained. Therefore, it has been determined that while oil contents of lower and higher than about 7 to 15% may be employed with varying degrees of satisfaction, the preferred range of oil content is about 7–15%.

It is important that the addition of oil to the black should be accompanied by tumultuous agitation. "Tumultuous" agitation refers to agitation which is carried on with sufficient intensity to maintain substantially all of the particles which are being treated with oil in a condition of vigorous commotion and thorough turbulent mixing. Such agitation encourages each particle in the mass of black to move about quickly in the mass in a random fashion impinging upon and being impinged upon by other similarly moving particles. It should be apparent, therefore, that something more than mere mixing or mild agitation is involved. Instead of being gently pushed about through the mass of black, the particles of black must be forcibly thrown about in the confined zone and kept quite active.

There should be tumultuous agitation of the black at substantially all times during the addition of oil thereto. On the one hand, if the invention is being carried out as a batch process, the black should preferably be under agitation before the addition of oil begins; or, at the latest, agitation should begin practically at the same instant that the addition of oil begins. On the other hand, if the invention is being practiced as a continuous process wherein, for example, uncoated black enters one end of a mixing chamber, is sprayed with oil therein and exits the chamber in densified form at the other end, all of the black in every portion of the chamber reached by the spray should be under tumultuous agitation at substantially all times. Also, if there should be a temporary failure of agitation, or a pause in agitation, the addition of oil should cease until agitation is resumed. Unless these precautions are followed, there is a danger of forming pellets and difficultly dispersible agglomerates in the mass of black.

Ordinarily, the confined zone wherein the agitation of the black and the addition of the oil take place will be the mixing chamber of any suitable mixer adapted for continuous, semi-continuous or batch operation. The apparatus will be provided with means for agitating the bed of carbon black particles positively or indirectly. Positive mechanical agitation, wherein the agitating means includes implements which are repetitively caused to pass through the bed, is preferred. It is contemplated that a wide variety of mixing apparatus may be employed, provided the apparatus selected in any given instance can be operated with sufficient intensity to produce the desired tumultuous agitation.

Among the various suitable types of apparatus are Mikro-Pulverizers and sigma blade mixers. However, it has been found especially advantageous from an economic point of view to employ mixing equipment which is already commonly used in plants where carbon black is now produced in pelleted form. For instance, there is the very familiar type of wet-pelleting mill which has an elongated mixing chamber provided with an axial rotary shaft. Fixed on the shaft are a plurality of radially disposed pins arranged in rows extending along the length of the shaft within the chamber. The rows are disposed about the shaft with a uniform angular separation from one another. The pins in each row are substantially equally spaced from one another longitudinally and are slightly offset longitudinally from the pins in the adjoining rows. When the shaft of such a mill is rotated fast enough, the pins will readily maintain a mass of carbon black particles in a condition of tumultuous agitation.

The rate of rotation will depend on the number, spacing, shape and dimensions of the pins, the size of the chamber and the load of material therein; and the prediction of the proper rate for the many different mills available would be impossible. However, the intensity of agitation may be noted by visual inspection through inspection ports ordinarily provided in such mills and the intensity of agitation will of course be increased if the agitation does not appear to be tumultuous. Also, inadequate agitation can be detected by testing the densified product for uniformity of oil distribution using a procedure explained below.

The confined zone or mixing chamber will be provided with means for projecting the oil mist onto the black. Said means may perform the function of producing the mist, such as by impingement of the oil against a stream of gas or vapor or against a fan or rapidly whirling distributor member, or may merely perform the function of conveying oil to the bed from some other location or apparatus in which atomization has been carried out. Most commonly, however, the projecting means will include some sort of nozzle or nozzles located within the chamber in the upper portion thereof and directed downward towards the bed of carbon black in the lower portion thereof. The nozzle or nozzles will be connected by one or more conduits to a supply of oil outside the chamber.

Nozzles are available which have separate passages for oil and a gaseous or vaprous atomizing medium which breaks down the oil into a multitude of tiny droplets by a sudden transfer of large amounts of kinetic energy thereto. On the other hand, it has been found that the oil may be successfully converted to a fine mist without the use of an atomizing medium by forcing the oil alone through a so-called "atomizing nozzle" under pressures of 10–100 p.s.i.g. and higher. When a high viscosity oil is used, it may be necessary to preheat the oil to an elevated temperature, such as 200°–500° F. and to spray it under considerable pressure in order to obtain satisfactory atomization.

Best results are obtained by operating with a very fine oil mist. Preferably, the droplets in the oil mist should not be much larger than the particles in the mass of black onto which they are projected. The droplets may even be about the same size as the carbon black particles. It will be found that an atomizing nozzle with a relatively low capacity or flow rate will usually produce a finer mist than one which has a relatively high capacity. Accordingly, it will ordinarily be found beneficial to utilize a plurality of smaller capacity nozzles, instead of one large capacity nozzle, to project the oil onto the carbon black particles.

In order to obtain the desired even distribution of oil, it is important that the incoming oil mist be projected upon as large a proportion of the total exposed surface area of the bed as is possible. Also, it is important that as many as possible of the incoming oil droplets "collide" with particles of agitated black before coming in contact either with other droplets or with the walls defining the confined mixing zone. Thus, the atomizing nozzles should be trained in such a way as to substantially eliminate or at least minimize any overlapping or interference of their spray patterns. Also, the nozzles should be trained in such a manner that the oil mist emanating therefrom will be projected predominantly and preferably substantially completely onto the carbon black and not onto the walls of the confined zone. Finally, the nozzles should be trained so that the spray patterns thereof are as evenly distributed as possible with respect to the entire exposed area of the bed. Similar precautions should be observed in training any type of projecting means that might be adopted as a substitute for atomizing nozzles.

In order that a conventional carbon black pellet mill may properly be adapted for carrying out the preferred form of the process of this invention, it should be provided with a plurality of conical spray pattern atomizing nozzles mounted within the mixing chamber and pointing downward from the upper portion or top thereof onto the bed of carbon black. Particularly good results have been obtained by equally spacing the nozzles throughout the length of the chamber along a straight line above its axis. The spacing is such that the spray pattern of each nozzle is closely adjacent to the spray pattern of each neighboring nozzle where said spray patterns intersect the surface of the bed. However, no spray pattern intersects the chamber walls or any other spray pattern to any substantial extent. By arranging the nozzles in this manner, it is possible to insure that as nearly equivalent an amount of oil as possible is delivered to each portion of the chamber and to the carbon black particles under agitation therein.

During the addition of the oil, the rate of oil addition is limited to a rate which is no greater than that at which the oil can be readily taken up by the carbon black particles. The purpose of imposing such a limitation on the oil addition rate is to prevent the formation of localized accumulations of oil among the particles under treatment. By localized accumulation of oil is meant a coming together of a number of individual minute droplets of oil and the agglomeration thereof into a small pool or large droplet of oil, i.e., one that is considerably larger than any of the carbon black particles themselves. Localized accumulations of oil would result in a non-uniform product and are believed to contribute to the formation of pellets.

It is impossible to predict herein the proper oil addition rate for every conceivable set of operating conditions which might arise in connection with the practicing of this invention. The maximum acceptable oil addition rate is a variable which is in turn dependent upon various secondary variables, including the design and size of the mixing apparatus, the intensity with which it is operated, whether the carbon black particles are treated in batches or are charged into and discharged from the mixing apparatus continuously, the magnitude of the load of carbon black particles in the apparatus, the temperature and viscosity of the oil, the magnitude of the oil droplets in the oil mist, the number and spray pattern configurations of the nozzles employed in the atomization of the oil and, in continuous processing, the rate of carbon black throughput. If the secondary variables are manipulated in such a way as to encourage very rapid distribution of incoming oil throughout the mass of black, a relatively high oil addition rate is possible. If distribution does not take place quite so rapidly, a lower oil addition rate must be used. Rapid, uniform distribution of incoming oil can be encouraged by efficient agitation, by considerable intensity of agitation, by studiously avoiding the underfilling and over-filling or "choking" of the agitation apparatus, by employing heated oil of the lowest practical viscosity, by breaking the oil down into the finest mist possible, by uniformly directing the oil spray onto as large a proportion as possible of the total area of the surface of the bed of carbon black in the confined zone, and, in continuous processing, by keeping the carbon black throughput rate as uniform as possible.

The proper oil addition rate can be readily determined for any set of secondary variables. The process is operated at an arbitrarily selected oil addition rate. Then the product resulting from operation at that rate is tested for uniformity of oil dispersion and freedom from difficultly dispersible aggregates. If the product is acceptable, a higher oil rate may be possible. If the product is not acceptable, a lower oil rate should be tried. The maximum acceptable oil addition rate can be found by carrying out additional runs at successively higher or lower oil addition rates, depending on the results of the first run. It is advantageous to determine the highest oil addition rate which results in a consistently acceptable product, for this is the rate which will lead to the most economical production of densified black. If it happens that the oil addition rate for a given set of secondary variables is too low for economic production, or if an acceptable product cannot be produced at all under such conditions, then the secondary variables must be altered. They will, of course, be altered in a manner calculated to encourage more rapid and uniform distribution, as explained above. For instance, the intensity of agitation and/or the temperature of the oil could be increased.

Testing the densified black for freedom from difficultly dispersible aggregates and uniformity of oil dispersion is readily accomplished. Freedom from difficultly dispersible aggregates may be ascertained through the application of standards and testing procedures employed in the ink industry for judging ink-grade carbon pigments. In this connection, it should be understood that "substantially free from difficultly dispersible aggregates" as used herein, means that the oil densified black shall be sufficiently free from aggregates that will not readily break down under normal processing conditions for a given end-use product, to be regarded as commercially acceptable for preparation of such product.

An extraction procedure is employed to check for uniformity of oil dispersion. Five gram samples (or any other arbitrary amount) are selected at random from a quantity of oil densified black. The samples are placed in alundum thimbles and are extracted for thirty minutes with 50 ml. of benzene on a hot plate set at medium heat. The extract is heated on a water bath until no odor of benzene can be detected. Then it is placed in a 110° C. oven for 30 minutes. The residue is cooled in a desiccator and weighed and the percent of extractable oil in each sample is calculated. Uniformity of oil dispersion in the sampled material is judged by comparing the amounts of extractable oil found in the several samples.

The following examples illustrate the invention. All parts are by weight unless otherwise noted.

EXAMPLE 1

The process is conducted in a mixer of the above-described type, having a horizontal, cylindrical mixing chamber with an axial shaft and radially disposed pins arranged in 4 rows 90° apart along the length of the shaft. The pins in each row are about 6" apart from one another and their tips extend to within about ½" of the inside surface of the chamber. Pointing downward from the top of the chamber at 1' intervals along its length are Monarch (trademark) 0.5 g.p.h. (at 100 p.s.i.) 30° included angle conical pattern spray nozzles, all connected to an oil pump, oil heater and oil supply tank. 100 parts of loose HAF black available under the trademark Kosmos K–60 are placed in the chamber, which is slightly less than half-filled by the black. The shaft of the apparatus is operated at 235 r.p.m. The charging of the oil begins promptly thereafter, the oil being a printing ink vehicle oil which is a blend of 25% Sun's EE Lengthener Oil (trademark) and 75% Gulf's Paragon 30 Oil (trademark), having the following properties:

| | |
|---|---|
| API gravity/60° F. | 24.6 |
| Specific gravity/60° F. | 0.9067 |
| Density, lb./gal. | 7.550 |
| Flash point, Pensky-Martin _____° F_ | 305 |
| Viscosity: | |
|     SSU at 100° F. | 105 |
|     SSU at 210° F. | 35 |

The oil is preheated to 525° F. and is discharged under 100 p.s.i.g. pressure through the nozzles as a fine mist. About 10 parts of oil are added to the black over a 15-minute period; then, addition of oil and agitation are promptly terminated.

EXAMPLE 2

The procedure of Example 1 is repeated, except that 6 parts oil per hundred parts black are used.

EXAMPLE 3

The procedure of Example 1 is repeated, except that the black is an HAF black commercially available under the trademark Kosmos K–60, LLM.

EXAMPLE 4

The procedure of Example 1 is repeated, except that the black is a loose ink-grade HAF black commercially available under the trademark Elftex–8, and having the following analysis and properties:

| | |
|---|---|
| Carbon _____percent__ | 98.41 |
| Hydrogen _____do____ | 0.18 |
| Sulfur _____do____ | 0.61 |
| Oxygen [1] _____do____ | 0.62 |
| Ash _____do____ | 0.18 |
| BET area, m.$^2$/g. _____m.$^2$/g__ | 73 |
| Oil factor _____ | 113 |
| Void factor _____ | 117 |
| pH _____ | 8.8 |
| Tint _____ | 208 |

[1] By difference.

EXAMPLE 5

The procedure of Example 1 is repeated, except that the oil is a paraffinic mineral oil printing ink vehicle similar to Gulf Paragon 30, but containing very small amounts of organometallic drier and blue toner.

EXAMPLE 6

The procedure of Example 1 is repeated, except that the oil of Example 5 and the black of Example 3 are used.

EXAMPLE 7

The procedure of Example 1 is repeated, except that the oil of Example 5 and the black of Example 4 are used.

EXAMPLE 8

The procedure of Example 1 is repeated, except that the black is ISAF black commercially available under the trademark United 70–ISAF and the oil is an aromatic rubber processing oil available under the trademark Dutrex 726, and having the following analysis and properties:

| | |
|---|---|
| Molecular analysis, clay-gel method, percent by weight: | |
|     Asphaltenes _____ | 0 |
|     Polar compounds _____ | 11.2 |
|     Aromatics _____ | 68.6 |
|     Saturates _____ | 20.2 |
| Distillation, ° F., 760 mm.: | |
|     IBP _____ | 672° |
|     5% _____ | 743° |
|     10% _____ | 762° |
|     50% _____ | 813° |
|     90% _____ | 861° |
| API gravity/60° F. _____ | 11.5 |
| Specific gravity/60° F. _____ | 0.9895 |
| Density, lb./gal. _____ | 8.241 |
| Flash point, Pensky-Martin _____ | 425 |
| Pour point, ° F. _____ | 60 |
| Viscosity: | |
|     SSU at 100° F. _____ | 3,235 |
|     SSU at 210° F. _____ | 83 |

About 7 parts of oil are added to each 100 parts of black.

EXAMPLE 9

The procedure of Example 8 is repeated, except that about 30 parts of oil are added to each 100 parts of black.

EXAMPLE 10

The procedure of Example 8 is repeated, except that about 33 parts of oil are added to each 100 parts of black.

Evaluation of results

In each case, a product of significantly greater bulk density is obtained, that is, the apparent bulk density of the product differs from that of the black utilized therein by an amount which is substantially greater than can be attributed to the mere weight of the added oil. Also, all extraction tests on random samples of black produced during the same run show a maximum deviation of only about 0.1% or less from their average value, thus demonstrating that an exceptionally uniform distribution of the oil has been attained. The results of the various examples are set forth in the table which follows:

TABLE

| Ex. No. | Initial App. Bulk Density (lb./ft.$^3$) | Avg. of Oil Extractions (Percent) | Maximum Deviation (Percent) | App. Bulk Dens.-Prod. (lb./ft.$^3$) | Increase in App. Bulk Dens. (Percent) |
|---|---|---|---|---|---|
| 1 | 9.7 | 10 | (*) | 13.8 | 41.3 |
| 2 | 8.0 | 6 | (*) | 10.0 | 25.0 |
| 3 | 12.3 | 10 | (*) | 15.3 | 24.4 |
| 4 | 10.1 | 10 | (*) | 15.1 | 50.5 |
| 5 | 9.7 | 10.7 | 0.1 | 14.7 | 51.5 |
| 6 | 12.3 | 10.1 | 0.05 | 19.6 | 59.3 |
| 7 | 10.1 | 10.4 | 0.05 | 14.2 | 40.5 |
| 8 | 6.8 | 7.15 | 0.1 | 14.2 | 108.6 |
| 9 | 7.2 | 29.9 | 0.1 | 16.8 | 133.3 |
| 10 | 7.1 | 33.2 | 0.1 | 21.2 | 198.5 |

*Only one oil extraction test is run on the black from these examples.

The products of Examples 1–9 are sufficiently free of difficultly dispersible aggregates to be commercially acceptable for use in printing ink. There are practically no pellets in the product, which has little tendency to give off air-borne dust. Thus, it is apparent that the process of the present invention avoids the disadvantages often associated with pellets by adding oil directly to carbon black to produce an unpelleted product of significantly enhanced bulk density, with diminished dust problems and very uniform distribution of oil, a combination of results which is believed to have been impossible or at least very difficult to attain heretofore. The results of Example 10 show that with 33.2% oil, a very large increase in bulk density is obtained. However, such increase is accounted for by the aggregation of some of the carbon black into pellets, which are easily observed visually.

I claim:
1. A method of densifying carbon black, consisting essentially of: evenly distributing a stable densifying oil in the form of a fine mist onto particles of loose carbon black in a bulky mass of said particles in a confined zone, the addition of oil being accompanied at substantially all times by tumultuous agitation of said mass, in which substantially all of the carbon black particles in the mass which are being treated with said oil are subjected to agitation with sufficient intensity to forcibly throw them about in the treating zone and to maintain them in a state of vigorous commotion and thorough turbulent mixing the rate of oil addition being limited to a rate which is no greater than that at which the oil can be readily taken up by said particles to prevent the collection of localized accumulations of oil within said mass, and the amount of oil employed being about 5 to about 32 parts by weight per hundred parts black; and recovering from said confined zone an unpelletized loose carbon black product that is substantially free of difficultly dispersible aggregates and exhibits significantly enhanced bulk density.

2. A method according to claim 1 wherein the method is carried out continuously.

3. A method according to claim 1 wherein the method is carried out batchwise.

4. A method according to claim 1 wherein the amount of oil which is employed is about 7–15 parts per hundred parts carbon black.

5. A method according to claim 1 wherein the oil is pre-heated.

6. A method according to claim 1 wherein said oil mist comprises droplets and said droplets are projected predominantly onto said mass before coming in contact with the walls defining said confined zone.

7. A method according to claim 1 wherein the oil mist is projected onto said mass as a plurality of evenly distributed, non-interfering sprays.

References Cited

UNITED STATES PATENTS

| | | | |
|---|---|---|---|
| 2,050,193 | 8/1936 | Park | 106—307 |
| 2,228,704 | 1/1941 | Offutt | 23—314 |
| 2,813,040 | 11/1957 | Rowe et al. | 23—314 |
| 2,848,347 | 8/1958 | Rushford | 106—307 |
| 2,942,299 | 6/1960 | Larson | 23—314 |
| 3,005,725 | 10/1961 | Daniell | 106—307 |
| 3,011,902 | 12/1961 | Jordan | 106—307 |
| 3,282,719 | 11/1966 | Voet | 106—307 |

TOBIAS E. LEVOW, *Primary Examiner.*

S. E. MOTT, *Assistant Examiner.*